U. G. SMITH.
MEANS FOR PREVENTING FREEZING OF WATER IN STOCK TANKS, &c.
APPLICATION FILED SEPT. 15, 1910.
994,543.
Patented June 6, 1911.
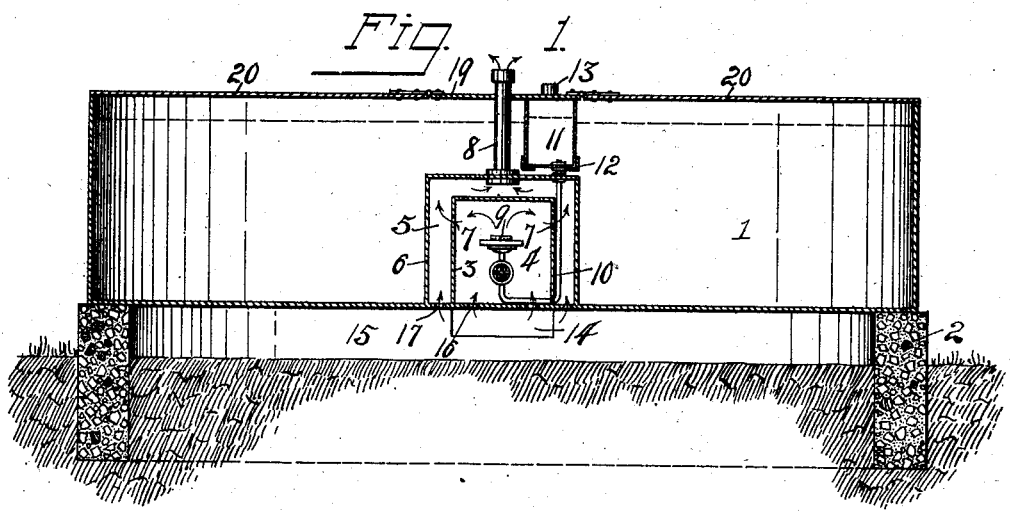
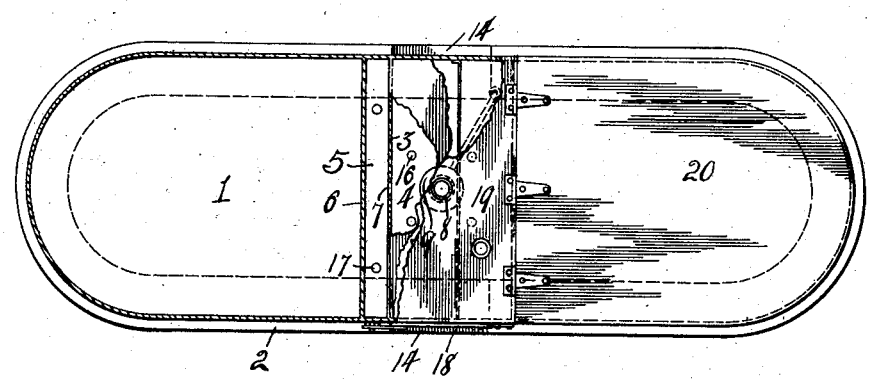
WITNESSES.
INVENTOR.

UNITED STATES PATENT OFFICE.

ULYSUS G. SMITH, OF FAYETTE, OHIO.

MEANS FOR PREVENTING FREEZING OF WATER IN STOCK-TANKS, &c.

994,543. Specification of Letters Patent. Patented June 6, 1911.

Application filed September 15, 1910. Serial No. 582,200.

*To all whom it may concern:*

Be it known that I, ULYSUS G. SMITH, a citizen of the United States, and a resident of Fayette, in the county of Fulton and State of Ohio, have invented a certain new and useful Means for Preventing Freezing of Water in Stock-Tanks or the Like; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to animal or stock tanks, but is not restricted to such use as it can be used in any connection for which it may be adapted or appropriate.

The object of my invention is the provision, in association with a stock watering tank or the like, of simple, efficient and economical means for heating or taking the chill from the water therein, whereby to prevent a freezing of such water, thus adapting it for use in cold places.

The invention is fully described in the following specification, and while, in its broader aspect it is capable of embodiment in numerous forms, a preferred embodiment thereof is illustrated in the accompanying drawings, in which,—

Figure 1 is a central, vertical, longitudinal section of a tank embodying the invention, and Fig. 2 is a top plan view thereof with portions broken away.

Referring to the drawings, 1 designates a stock or animal watering tank of any suitable size and shape, which, in the present instance, is shown as being of oblong form and as resting at its lower edge upon a concrete or other substantial form of base 2.

Located within the tank 1 preferably adjacent its center and extending from one side to the other thereof is a casing 3 which rests upon the tank bottom and coöperates therewith and with the side walls of the tank to form a combustion chamber 4. Surrounding the casing 3 and spaced therefrom to provide an intermediate air circulating space 5 is a casing 6 which is also shown, in the present instance, as rising from the tank bottom and as having its top as well as its sides spaced from the casing 3. The chamber 4 and circulating space 5 have communication with each other through a series of apertures 7 provided in the side walls of the casing 3 and the air passing to the space 5 is permitted to have an exit therefrom through a pipe 8 leading from the top thereof above the tank.

Located within the combustion chamber 4 is a burner 9 which has communication through a valve controlled pipe 10 with a fuel supply tank 11 located above the casing 6 in spaced relation to it and also to the pipe 8. The fuel tank 11 is shown as resting upon angle-iron bars 12 which extend transversely of the tank, and as having a filling nipple 13. To facilitate a continued circulation of air to the chamber 4 and from it through the space 5 and pipe 8 to the atmosphere, the base 2 is shown as being cut away or provided with openings 14 beneath portions of the tank to admit air to the space 15 beneath the tank, and this air is admitted to the combustion chamber 4 through openings 16 in the bottom thereof, as indicated. It is also preferable to admit a portion of such air to the circulating space 5 through openings 17 in the bottom thereof to permit such air to commingle with the heated air passing to such space from the combustion chamber. Access to the combustion chamber 4 is had through an opening in the side of the tank at one end of such chamber, such opening being closed by a door 18.

The top of the tank is shown as being closed over the casing 6 and tank 11 by a stationary plate 19, to the opposite side edges of which are hinged covers 20, which are adapted to fit over and close the remaining top portion of the tank.

In the use of my invention, the burner 9 is lighted in cold weather to heat air circulating through the chamber 4, circulating space 5 and pipe 8 to take the chill from the water contained in the tank and prevent a freezing thereof, the burner flame, of course, being regulated to suit the heat required for such purpose. The heating of the water adjacent the casing 6 creates a sufficient circulation of such water within the tank due to the natural tendency of the heated water to rise, to substantially equalize the temperature of the water and prevent freezing thereof at points remote from the heating means. The spacing of the fuel tank 11 from the casing 6 and pipe 8 permits a circulation of water therebetween to prevent any possibility of the fuel in the tank being ignited.

It is evident that I have provided simple and efficient means for obtaining a heating of water within a tank to prevent a freezing of the same therein, and that such means may be adapted for and easily mounted in any of the numerous forms of stock tanks commonly used.

I wish it understood that my invention is not limited to any specific construction or arrangement of the parts except in so far as such limitations are specified in the claims.

Having thus described my invention, what I claim as new and desire to secure by Letters Patent, is,—

1. The combination with an animal watering tank having openings in its bottom in communication with the atmosphere, of a combustion chamber mounted within the tank upon the bottom thereof over said openings whereby air is admitted thereto through the tank bottom, a casing forming a hot air chamber over the top and on opposite sides of the combustion chamber, said hot air and combustion chambers being in communication, a flue leading upwardly from the hot air chamber above the tank, a liquid fuel tank within the water tank in spaced relation to said casing and flue to permit water within the tank to circulate therebetween, a burner within the combustion chamber, and a pipe leading from the fuel tank to the burner and extending for a considerable distance through the hot air chamber.

2. The combination with an animal watering tank having a top thereon and openings in the central portion of its bottom, said openings communicating with an air circulating space beneath the tank, a box resting upon the bottom of such tank over said openings in communication therewith and extending entirely across the tank, a casing extending from side to side of the tank and forming a hot air chamber at the sides and over the top of said box, said hot air chamber being in communication with the interior of the box, a flue leading from the top of said chamber above the tank top, the top of said casing terminating below the high water line of the tank, a liquid fuel tank disposed intermediate the top of the watering tank and the top of said casing in spaced relation to the latter and to said flue, a pipe leading from said fuel tank down through the hot air chamber and into said box, and a burner connected to the pipe within said box substantially as described.

In testimony whereof, I have hereunto signed my name to this specification in the presence of two subscribing witnesses.

ULYSUS G. SMITH.

Witnesses:
   GOODELL B. CAULKINS,
   ELMER J. TYLER.